United States Patent [19]
Leins et al.

[11] Patent Number: 5,641,251
[45] Date of Patent: Jun. 24, 1997

[54] ALL-CERAMIC DRILL BIT

[75] Inventors: August Leins, Schlierbach; Rolf Müller, Tübingen, both of Germany

[73] Assignee: Cerasiv GmbH Innovatives Keramik-Engineering, Plochingen, Germany

[21] Appl. No.: 466,339

[22] Filed: Jun. 6, 1995

[30] Foreign Application Priority Data

Jul. 14, 1994 [DE] Germany ............... 44 24 885.7

[51] Int. Cl.⁶ .................................................. B23B 51/00
[52] U.S. Cl. ................................................ 408/144; 408/229
[58] Field of Search .......................... 408/227–229, 408/144; 407/119, 54

[56] References Cited

U.S. PATENT DOCUMENTS

| | | | |
|---|---|---|---|
| 500,213 | 6/1893 | Richards | 408/229 |
| 2,587,980 | 3/1952 | Doepker | 408/228 |
| 4,461,799 | 7/1984 | Gavrilov et al. | 408/144 |
| 5,002,439 | 3/1991 | Lauder | 407/119 |

FOREIGN PATENT DOCUMENTS

| | | | |
|---|---|---|---|
| 3930936 | 7/1990 | Germany. | |
| 2116401 | 5/1990 | Japan | 408/144 |
| 406246521 | 9/1994 | Japan | 408/144 |

OTHER PUBLICATIONS

Werkstatt Und Betrieb, 1991 "Vollkeramik–Spiralbohrer Fur Ein–Breites Anwendungsgebiet".
Wilson F.W., Harvey, 1959, Tool Engineers Handbook.
Bohrmeister Guhring, 25 Jahrgang Ausgabe 37/92.
Wilfried König, 1984 Fertigungsverfahren Ban 1.

*Primary Examiner*—Steven C. Bishop
*Attorney, Agent, or Firm*—Felfe & Lynch

[57] ABSTRACT

Disclosed is an all-ceramic drill bit which combines the positive properties of ceramic with a tool geometry adapted to the special features of the material. The drill bit is formed with a groove for the shavings which extends in the axial direction linearly along a surface line.

10 Claims, 3 Drawing Sheets

ALL-CERAMIC DRILL BIT

BACKGROUND OF THE INVENTION

The present invention is in an all-ceramic drill bit having a groove for shavings.

When drilling with HSS (high speed steel) and HM (hard metal) tools, an increase in the machining performance is possible only to a limited degree. The machine tool usually fails because the elevated-temperature hardness has been exceeded if the cutting speed is increased further. Such limitations result in longer manufacturing times for the corresponding operations and, consequently, a higher cost share during tool manufacture. Moreover, these tools require that a cooling lubricant be constantly supplied during use. However, the disposal of the used lubricants increasingly creates problems at the present time.

It has been found that a significant increase in performance may be obtained if the tool is formed or constructed of other materials. Because of the characteristic values of the materials and the positive development in the lathing and milling area, ceramic materials are desirable. Ceramic materials have a very high elevated-temperature hardness and wear resistance and thus promise significant advantages for increasing cutting speed values. In addition to a decrease in processing times, further advantages of using ceramic drilling tools include a very high surface quality, low wear values, and dry processing resulting in both economic and ecological advantages.

However, when designing a tool from a particular material, the characteristics of that material must be taken into account in the geometric design of the tool. Because the toughness of a ceramic is significantly less than that of HSS and HM, the material must have the highest possible cross section. As a result of the high cutting values and the consequently large volume of metal removed, the cross section of the grooves for the shavings must be as large as possible. The polished section of the chisel edge must therefore be designed so that crushing of material due to cutting speeds tending towards zero in the center of the drill are largely avoided (occurrence of tensile stresses in the cutting material).

All-ceramic drilling tools or drill bits with HSS geometries are known, see a publication of Bohrmeister Guehring, Mit Keramik in die Vollen, Volume 25, NO. 37/92, pages 14 to 17. However, in the known all ceramic drilling tools or bits, the polished section has not been adapted to the special properties of the ceramic material. The tools fail particularly due to fracture and chipping resulting from an incorrect geometry of the cutting material.

It is an object of the invention to provide an improved all-ceramic drill bit with a groove for shavings of a construction such that the positive properties of the ceramic are associated with a tool geometry adapted to the special features of the material.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

THE INVENTION

Figure 1:
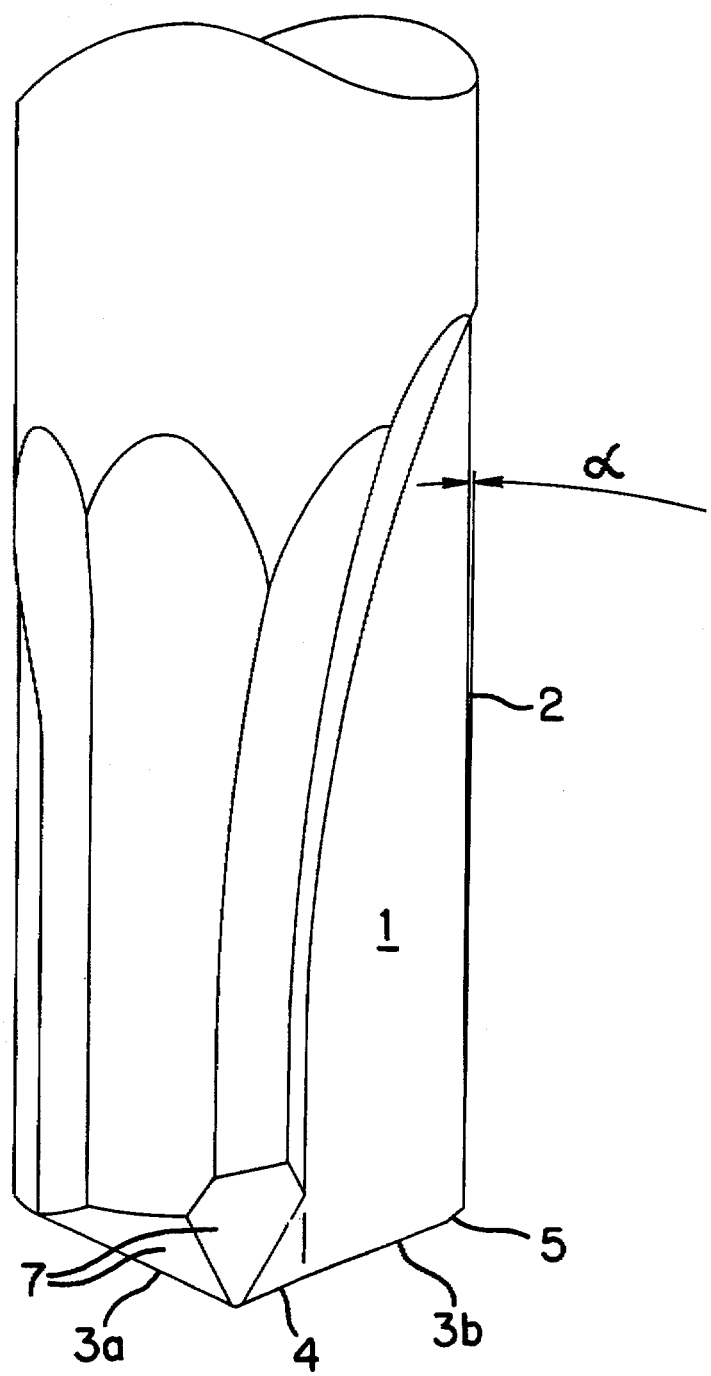
FIG. 1 shows a front elevation view of an all-ceramic drill bit of the invention.

In accordance with the invention, the above stated object is obtained in that an all ceramic drill bit has a groove for shavings which is linear along a surface line in the axial direction of the bit. That is to say the drill bit groove is not twisted, i.e., has an angle of twist of zero. By this construction, the tool structure is adapted optimally to the ceramic material. Moreover, the tool structure provides a good discharge of the shavings at the cutting speeds attainable with drill bits of the invention.

Those of ordinary skill in the art are familiar with drill bit grooves for shavings, bevel, etc. These concepts are described in Studium und Praxis (Study and Practice); Wilfried Koenig; Fertigungsverfahren (Manufacturing Processes), Volume 1, Drehen, Fraesen, Bohren (Lathing, Milling, Drilling); 2nd Edition, 1984, VDI-Verlag GmbH, Duesseldorf, pages 290 to 303.

In a preferred embodiment, an all-ceramic drill bit of the invention is preferably produced from a silicon nitride ceramic, an aluminum oxide ceramic or a mixed ceramic. The bit groove for the shavings is provided with a guiding bevel, which extends in the axial direction of the drill bit and tapers towards the rear. The "rear" is the end of the drill bit opposite the drill point.

Advantageously, the guide bevel tapers by 0.5°–1° towards the rear. The width of the guide bevel preferably is not more than 0.5 mm. The frictional forces are reduced by the design of the guide bevel region. Likewise, the torsional stress is decreased.

The point angle advantageously is at least 140°. By these means, the discharge of the shavings is ensured even in the case of tough or soft materials.

In another preferred embodiment of the invention, the all-ceramic drill bit has a coating at least in partial regions. This coating preferably consists of one or more layers of a material such as titanium nitride and/or aluminum oxide and/or titanium carbonitride or a very hard coating such as diamond, CBN (cubic boron nitride) or $B_4C$ (boron-4-carbide).

Furthermore, the core should be of a thickness of at least 0.30 times the drill bit diameter. By these means, sufficient tool stability is attained, even when the diameter of the drill bit is small. The chisel edge advantageously is provided with cross grinding, as a result of which crushing of the material is largely avoided and the specific load on the cutting edge remains small.

A facet is provided at the transition from the main cutting edge to the guiding bevel in order to avoid burrs as the tool exits. Preferably, the cutting edges are provided with a protective bevel or roundness.

In particular, a tool of the invention is highly advantageous in that it permits a) drilling, drilling countersinking, drilling and subsequently backwards countersinking, and stepped drilling;

b) use at high cutting speeds and advances;

c) very good discharge of shavings;

d) a very high surface quality at the borehole wall;

e) a burr-free withdrawal from the workpiece; and f) dry processing.

Referring to the drawings, the tip of the drill bit has, as usual, two main cutting edges 3a, 3b with a chisel edge 4 connecting the two main cutting edges 3a, 3b. The point angle, that is, the angle between the two main cutting edges 3a, 3b is preferably, and should not be less than, 140°. The grooves 1 for the shavings are not twisted, that is, the angle of twist is zero. The grooves are linear in the drill bit's axial direction along a surface line, i.e. bevel 2. On the basis of this essential feature of the invention, the main cutting edges 3a, 3b are shaped linearly and are not bent, as is customary for the twisted drill bits of the state of the art. The drill bit is constructed with mirror symmetry with respect to the grooves 1 for the shavings.

Figure 3:
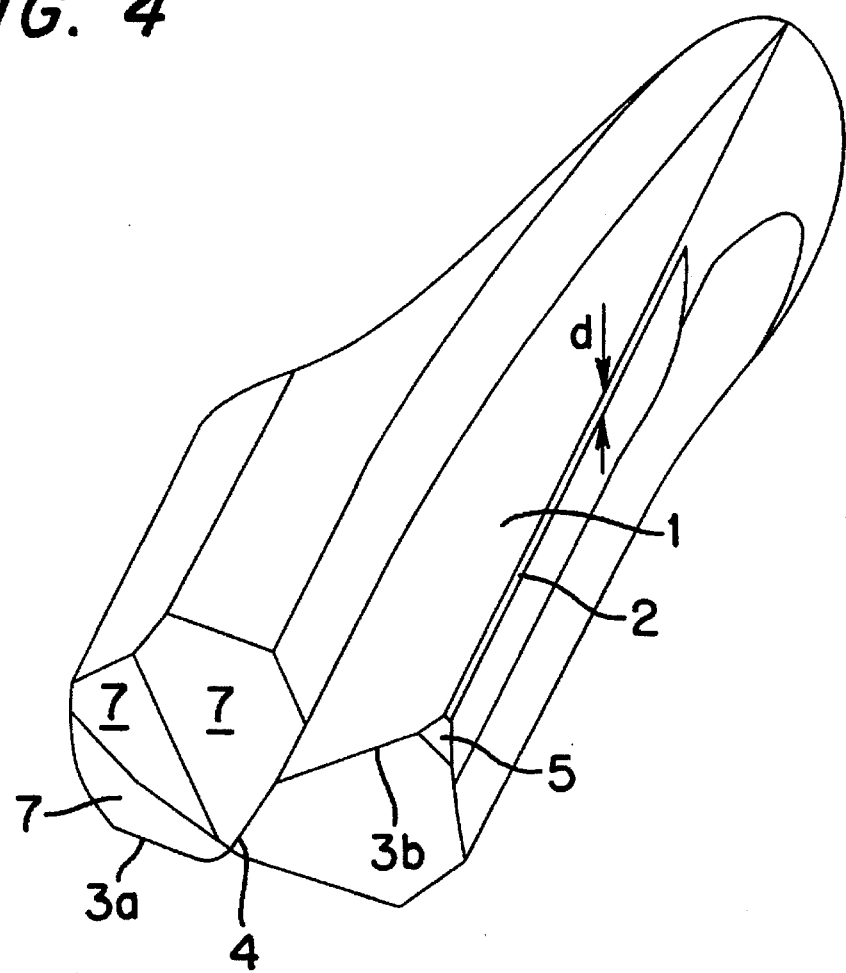
FIG. 3 shows a further view of a portion of the drill bit of FIG. 1.

The groove 1 for the shavings is provided with a guiding bevel 2, which extends in the axial direction of the drill bit and tapers towards the rear by an angle $\alpha$ (FIG. 1), which lies between 0.5° and 1°. The guiding bevel 2 has a width d which is not more than about 0.5 mm. FIG. 3 shows the width d of the guiding bevel 2. A facet 5 is disposed at the transition from the main cutting edge 3a, 3b to the guiding bevel 2 in order to avoid burrs as the tool exits the workpiece.

Figure 2:
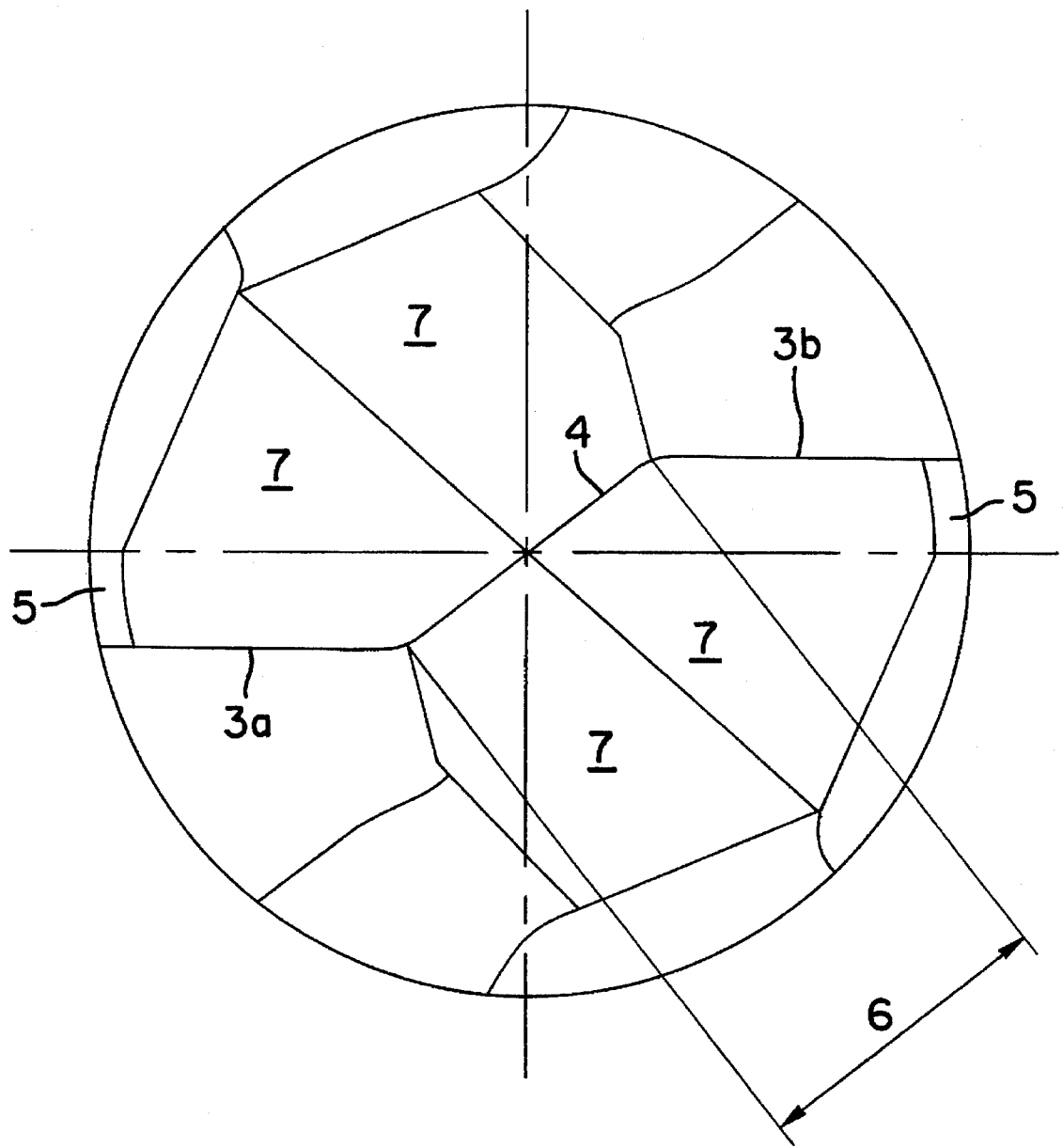
FIG. 2 shows in plan view the tip of the drill bit of FIG. 1 in the axial direction.
Figure 4:
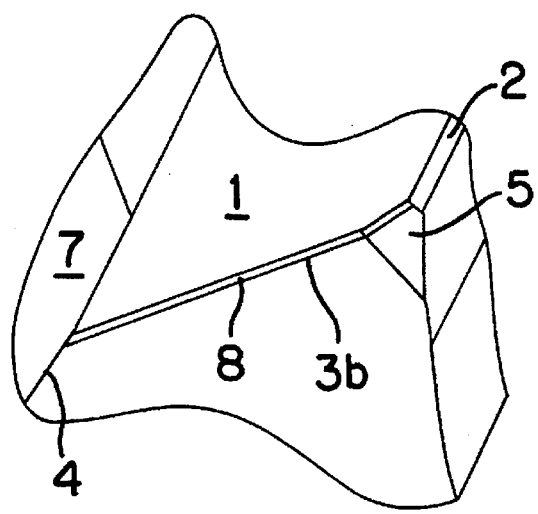
FIG. 4 shows an enlarged representation of a part of the drill bit tip of FIG. 3.

The thickness 6 of the core (FIG. 2) is at least 0.30 times the diameter of the drill bit and provides the tool with improved stability. The chisel edge 4 is provided with a cross grinding 7, as a result of which the specific cutting edge load remains low. For protection, the cutting edges are provided with a protective bevel or roundness 8 (FIG. 4). The protective bevel preferably has a width of 0.03–0.1 mm and an angle of 5° to 20°. In the case of a roundness, the latter has a radius of 0.02 to 0.1 mm.

It will be understood that the specification and examples are illustrative but not limitative of the present invention and that other embodiments within the spirit and scope of the invention will suggest themselves to those skilled in the art.

What is claimed is:

1. An all-ceramic drill bit having a drill point, a rear and a groove for shavings, the groove extending in an axial direction linearly, along a surface line, said groove having a guiding bevel extending in the axial direction of the drill bit.

2. The all-ceramic drill bit of claim 1 wherein the guiding bevel tapers rearwardly.

3. The all-ceramic drill bit of claim 2, wherein the guide bevel rearward taper is by an angle $\alpha$=0.5° to 1°.

4. The all-ceramic drill bit of claim 2, wherein the guiding bevel has a width which does not exceed 0.5 mm.

5. The all-ceramic drill bit of claim 2, having two main cutting edges with a point angle of at least 140°.

6. The all-ceramic drill bit of claim 1, wherein the all-ceramic drill bit has at least one coating in partial regions.

7. The all-ceramic drill bit of claim 6, wherein the coating consists of one or more layers of a material selected from the group consisting of titanium nitride, aluminum oxide, titanium carbonitride, diamond, CBN (cubic boron nitride), $B_4C$ (boron-4-carbide) and mixtures thereof.

8. The all-ceramic drill bit of claim 5, the drill bit further comprising a facet at the transition from the main cutting edges to the bevel.

9. The all-ceramic drill bit of claim 1 having two main cutting edges with a point angle of at least 140°.

10. The all-ceramic drill bit of claim 1 wherein the drill bit further comprises a facet at the transition from the main cutting edges to the bevel.

\* \* \* \* \*